United States Patent
Auerbach et al.

(10) Patent No.: US 7,411,495 B2
(45) Date of Patent: Aug. 12, 2008

(54) SMART CONTAINER MONITORING SYSTEM

(75) Inventors: Micha Auerbach, Maccabim (IL); Rony Cohen, Zoran (IL); Eli Golan, Ramat Hasharon (IL); Alex Isenberg, Rishon LeZion (IL); Arcadi Genin, Bat Yam (IL); Ran Sender, Tel Aviv (IL); Shmuel Blum, Zoran (IL)

(73) Assignee: HI-G-TEK Ltd., Pr-Yehuda (IL)

( * ) Notice: Subject to any disclaimer, the term of this patent is extended or adjusted under 35 U.S.C. 154(b) by 128 days.

(21) Appl. No.: 11/078,240

(22) Filed: Mar. 10, 2005

(65) Prior Publication Data

US 2005/0212671 A1 Sep. 29, 2005

Related U.S. Application Data

(63) Continuation-in-part of application No. 10/526,318, filed as application No. PCT/IL2003/000676 on Aug. 14, 2003.

(51) Int. Cl.
*G08B 1/08* (2006.01)
(52) U.S. Cl. .............. 340/539.26; 340/572.8; 340/568.2; 340/546
(58) Field of Classification Search . 340/539.1–539.26, 340/572.1, 572.8, 546
See application file for complete search history.

(56) References Cited

U.S. PATENT DOCUMENTS

| 4,688,244 | A | * | 8/1987 | Hannon et al. ............... 377/58 |
| 4,750,197 | A | | 6/1988 | Denekamp et al. |
| 4,782,784 | A | | 11/1988 | Little |
| 5,056,837 | A | | 10/1991 | Fuehrer |
| 5,097,253 | A | | 3/1992 | Eschbach et al. |
| 5,127,687 | A | | 7/1992 | Guiler |
| 5,169,188 | A | | 12/1992 | Kupperman et al. |
| 5,189,396 | A | | 2/1993 | Stobbe |
| 5,392,025 | A | | 2/1995 | Figh et al. |
| 5,406,263 | A | | 4/1995 | Tuttle |
| 5,410,301 | A | | 4/1995 | Dawson et al. |
| 5,421,177 | A | | 6/1995 | Sieber et al. |
| 5,565,858 | A | | 10/1996 | Guthrie |
| 5,570,080 | A | | 10/1996 | Inoue et al. |
| 5,587,702 | A | | 12/1996 | Chadfield |
| 5,615,247 | A | * | 3/1997 | Mills ........................ 455/411 |
| 5,656,996 | A | | 8/1997 | Houser |
| 5,691,980 | A | | 11/1997 | Welles, II et al. |
| 5,831,531 | A | | 11/1998 | Tuttle |
| 5,892,441 | A | * | 4/1999 | Woolley et al. ........ 340/539.26 |
| 6,023,218 | A | | 2/2000 | Tremblay |
| 6,055,426 | A | | 4/2000 | Beasley |
| 6,069,563 | A | | 5/2000 | Kadner et al. |

(Continued)

*Primary Examiner*—Benjamin C. Lee
(74) *Attorney, Agent, or Firm*—Abelman, Frayne & Schwab

(57) ABSTRACT

A remotely monitorable shipping container including a shipping container body having associated therewith at least one door and at least one door latch having a latch locking element arranged for locking engagement with a door mounted locking element, at least one wireless communicator mounted in a secure location within the shipping container and being operative to wirelessly transmit information to a remote monitor regarding the status of an electronic seal mounted onto the locking element for confirming locking of the at least one door, and at least one wireless antenna mounted within a protected enclosure on the outside of the shipping container for transmitting the information from the at least one wireless communicator.

10 Claims, 13 Drawing Sheets

U.S. PATENT DOCUMENTS

| | | | |
|---|---|---|---|
| 6,166,627 A * | 12/2000 | Reeley | 340/426.25 |
| 6,339,397 B1 * | 1/2002 | Baker | 342/357.07 |
| 6,646,555 B1 | 11/2003 | Forster et al. | |
| 6,744,366 B2 | 6/2004 | How | |
| 6,753,775 B2 * | 6/2004 | Auerbach et al. | 340/539.22 |
| 6,919,803 B2 * | 7/2005 | Breed | 340/539.14 |
| 6,927,688 B2 * | 8/2005 | Tice | 340/539.26 |
| 6,972,682 B2 * | 12/2005 | Lareau et al. | 340/568.1 |
| 2003/0164763 A1 * | 9/2003 | Hisano et al. | 340/539.13 |
| 2004/0066328 A1 * | 4/2004 | Galley et al. | 342/357.1 |
| 2006/0103524 A1 * | 5/2006 | Auerbach et al. | 340/545.6 |

\* cited by examiner

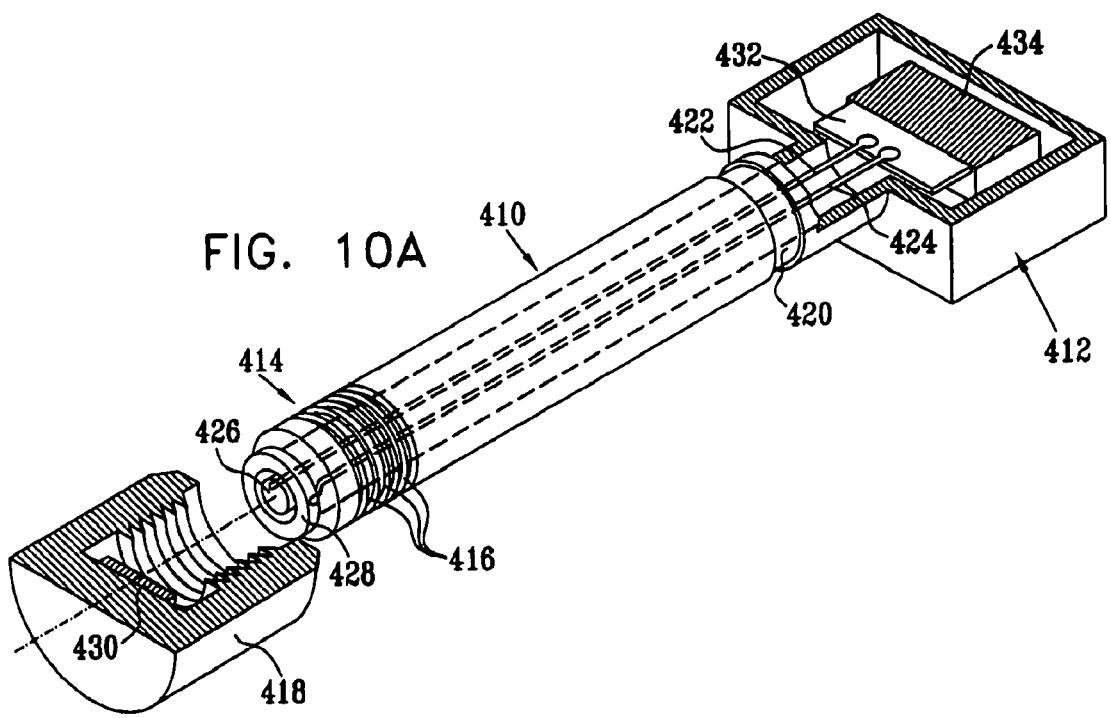
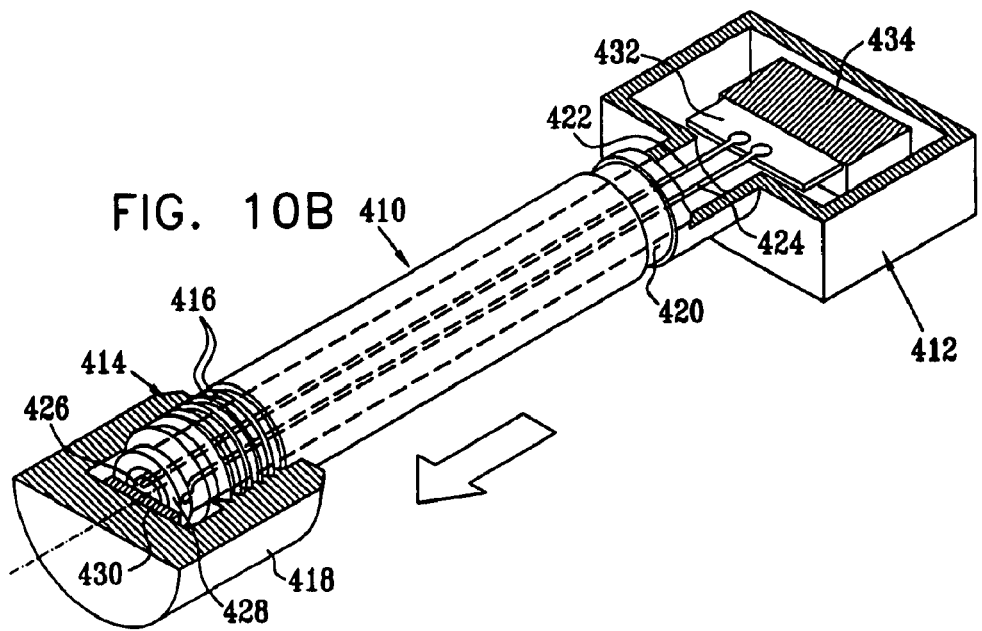

SMART CONTAINER MONITORING SYSTEM

REFERENCE TO CO-PENDING APPLICATIONS

This application is a Continuation In Part of U.S. patent application Ser. No. 10/526,318, filed Aug. 12, 2005, entitled "SMART CONTAINER MONITORING SYSTEM", which is a National Phase of International Patent Application No. PCT/IL 2003/000676, filed Aug. 14, 2003, which claims priority from U.S. patent application Ser. No. 10/228,842, filed Aug. 27, 2002, now U.S. Pat. No. 6,753,775, the disclosures of all of the foregoing being incorporated herein by reference.

FIELD OF THE INVENTION

The present invention relates to shipping and transportation of goods and more particularly to remotely monitorable shipping containers.

BACKGROUND OF THE INVENTION

The following U.S. Patents are believed to represent the current state of the art:
4,750,197; 5,056,837; 5,097,253; 5,127,687; 5,169,188; 5,189,396; 5,406,263; 5,421,177; 5,587,702; 5,656,996 and 6,069,563.

SUMMARY OF THE INVENTION

The present invention seeks to provide an improved remotely monitorable shipping container.

There is thus provided in accordance with a preferred embodiment of the present invention, a remotely monitorable shipping container including a shipping container body having associated therewith at least one door and at least one door latch having a latch locking element arranged for locking engagement with a door mounted locking element, at least one wireless communicator mounted in a secure location within the shipping container and being operative to wirelessly transmit information to a remote monitor regarding the status of an electronic seal mounted onto the locking element for confirming locking of the at least one door, and at least one wireless antenna mounted within a protected enclosure on the outside of the shipping container for transmitting the information from the at least one wireless communicator.

In accordance with a preferred embodiment, the at least one wireless communicator includes a transceiver. Preferably, the latch locking element includes a tamper-resistant remotely monitorable electronic seal including a shaft portion, a socket arranged to engage the shaft portion in a monitorable manner, whereby disengagement of the socket and the shaft portion results in a monitorable event, and a wireless communicator associated with at least one of the shaft portion and the socket and being operative to provide a remotely monitorable indication of the monitorable event.

In accordance with another preferred embodiment, the remotely monitorable shipping container also includes at least one sensor operative to sense at least one condition within the shipping container and wherein the at least one wireless transmitter and the at least one wireless antenna are operative to wirelessly transmit information regarding an output of the at least one sensor to a remote monitor. Preferably, the at least one sensor senses at least one of motion, carbon dioxide, infra-red emissions and temperature. Additionally, the at least one wireless communicator also transmits information regarding the status of the cargo, which is placed in the shipping container body.

In accordance with yet another preferred embodiment, the remotely monitorable shipping container also includes at least one GPS antenna for receiving signals relating to location of the shipping container and location reporting circuitry responsive to an output from the at least one GPS antenna for providing information to the at least one wireless communicator indicating location of the shipping container. Preferably, the at least one wireless communicator includes at least one RF transmitter. Additionally, the at least one wireless communicator includes at least one long range transmitter. Preferably, the at least one wireless communicator includes a transmitter communicating via at least one of cellular, radio and satellite communication networks.

There is also provided in accordance with a preferred embodiment of the present invention, a shipping container communications system which includes a remotely monitorable shipping container including a shipping container body having associated therewith at least one door and at least one door latch having a latch locking element arranged for locking engagement with a door mounted locking element, at least one wireless communicator mounted in a secure location within the shipping container and being operative to wirelessly transmit information to a remote monitor regarding the status of an electronic seal mounted onto the locking element for confirming locking of the at least one door, and at least one wireless antenna mounted within a protected enclosure on the outside of the shipping container for transmitting the information from the at least one wireless communicator. The shipping container communications system also includes at least one remote communicator communicating with the at least one wireless communicator. Preferably, the at least one wireless communicator includes at least one transceiver, communicating with the at least one remote communicator. Additionally, the at least one remote communicator includes at least one of a presence sensor and communicator, a remote monitor, and an electronic seal.

BRIEF DESCRIPTION OF THE DRAWINGS

The present invention will be understood and appreciated more fully from the following detailed description, taken in conjunction with the drawings in which:

FIGS. 10A and 10B are simplified pictorial illustrations of two stages in the assembly of a press-fit electronic seal particularly useful as a tamper resistant remotely monitorable electronic seal of the type illustrated in FIG. 4;

DETAILED DESCRIPTION OF A PREFERRED EMBODIMENT

Figure 1:
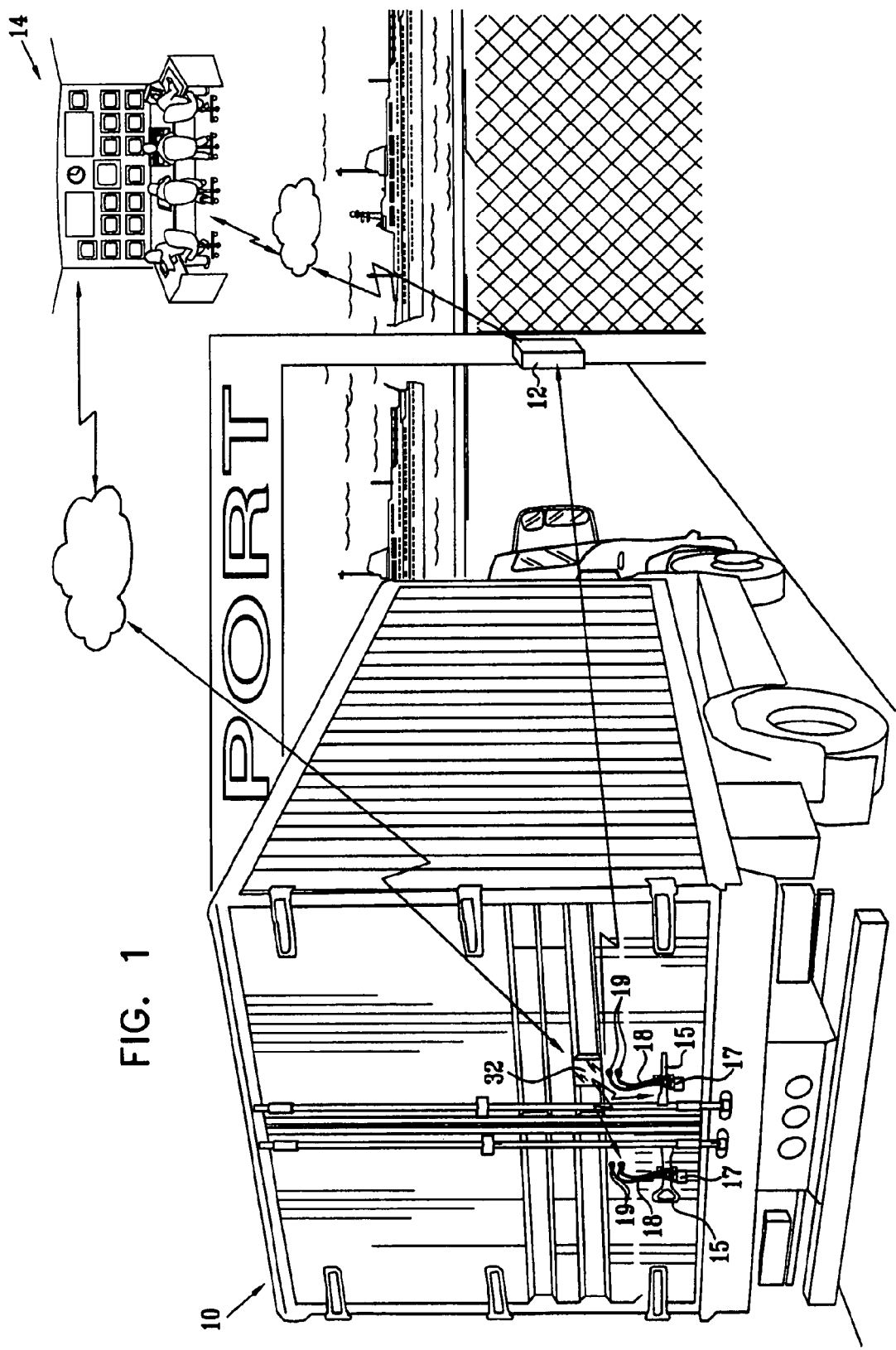
FIG. 1 is a simplified illustration of a shipping container communications system constructed and operative in accordance with a preferred embodiment of the present invention.
Figure 2:
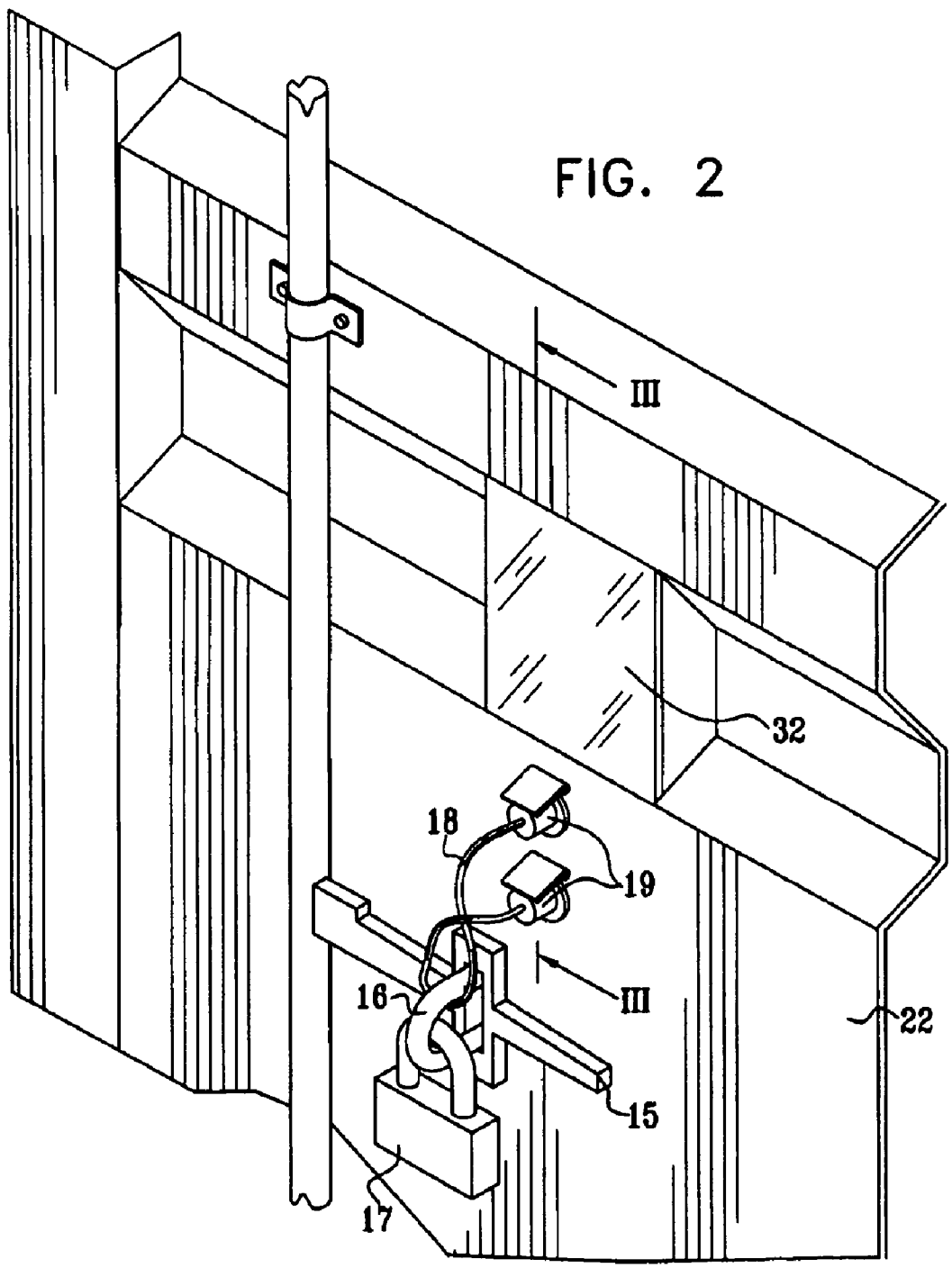
FIG. 2 is a simplified illustration showing sealing engagement of a door lock handle of a shipping container of the type illustrated in FIG. 1.
Figure 3:
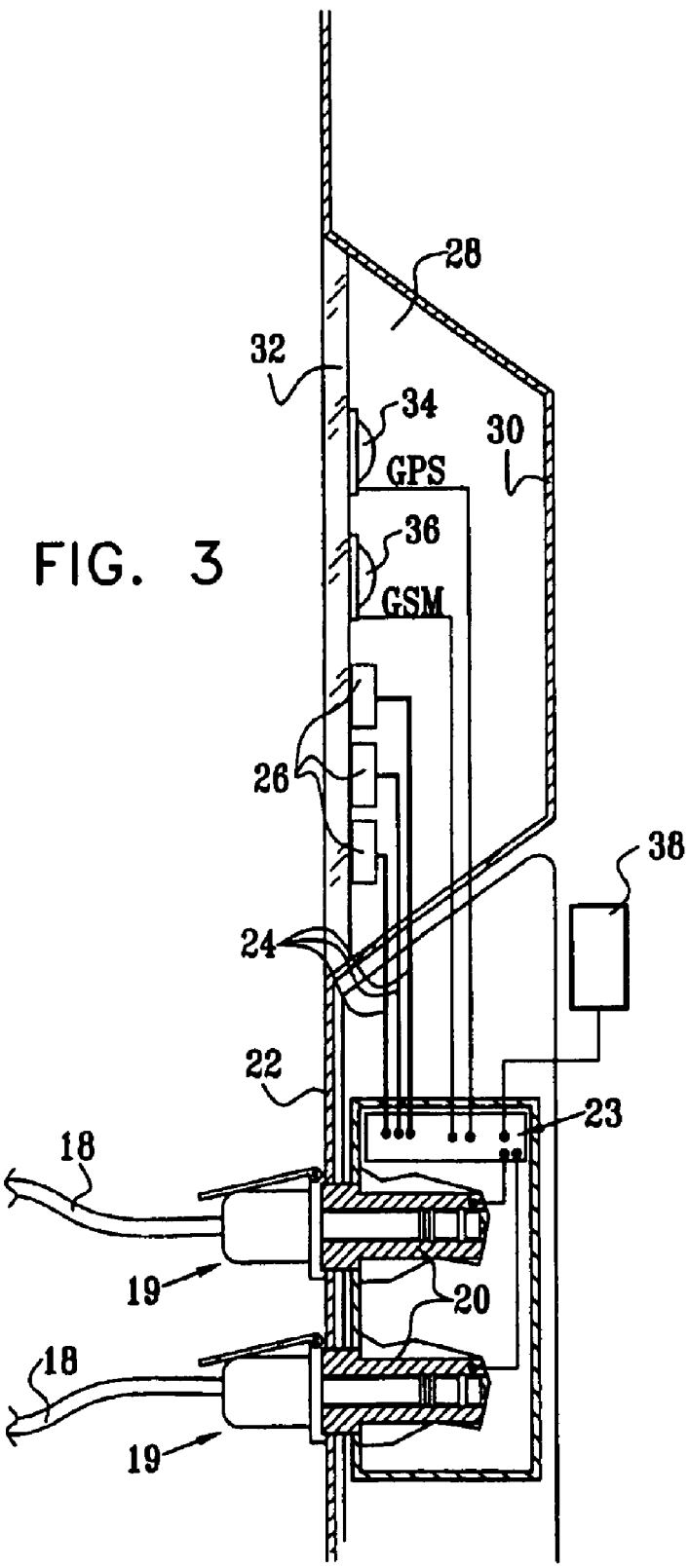
FIG. 3 is a sectional illustration taken along lines III-III of FIG. 2.

Reference is now made to FIGS. 1-3, which illustrate a shipping container communications system constructed and operative in accordance with a preferred embodiment of the present invention. As seen in FIG. 1, a shipping container 10, which may be a conventional shipping container useful for land and sea transport, is shown in communication with multiple communicators, including, for example, a presence communicator 12, located at the gate of a port, and a remote monitoring center 14, which may communicate with presence communicator 12 via a network in a wired or wireless manner. It is appreciated that any suitable type of shipping container may be employed. The term "shipping container" is used herein in a very broad sense to include any enclosure in which goods may be transported or stored.

Conventionally, shipping containers employ one or more hasps 15, which are fixed to door latches and are rotatably engageable with corresponding lockable members, such as loops 16, in the manner shown in FIGS. 1 and 2. Typically, a padlock 17 engages a portion of loop 16 which extends through a hasp 15, preventing disengagement of the hasp 15 from the loop 16 and thus preventing unlocking of the door. In order to confirm integrity of the lock, an electronic seal wire 18 is preferably passed through the loop 16 over the hasp 15. A preferred electronic seal wire is described and claimed in applicant/assignee's U.S. Pat. No. 6,069,563, the description of which is hereby incorporated by reference.

In accordance with a preferred embodiment of the present invention, first and second plugs 19, electrically communicating with respective first and second ends of the electronic seal wire 18, are removably received in respective sockets 20, which are recessed behind a wall 22 of a container door.

In accordance with a preferred embodiment of the present invention, as seen in FIG. 3, the sockets 20 communicate with electronic circuitry 23, which in turn communicates via conductors 24 with RF antennas 26 which are located within an enclosure 28 defined by an outer wall 30 of the container, typically formed of steel, and a cover 32, preferably formed of plastic or other dielectric material, which does not appreciably attenuate the output of the RF antennas 26.

Preferably, multiple transceivers forming part of circuitry 23 are employed for receiving and transmitting information relating to the integrity of the seal. Each transceiver preferably operates at an RF frequency characteristic of a given part of the world and communicates via corresponding multiple RF antennas 26. Typical transmission frequencies are 315 MHz for the Far East, 433 MHz for Europe and 916 MHz for the U.S.A. Spread spectrum frequencies may also be employed. It is appreciated that alternatively, unidirectional transmitters may be employed instead of transceivers. The transceivers preferably communicate with electronic seals mounted on the container as well as with external communicators, such as presence communicator 12, located at the gate of a port and remote monitoring center 14. Presence sensor and communicator 12 also may communicate with remote monitoring center 14.

Additionally in accordance with a preferred embodiment of the present invention, GPS and GSM antennas 34 and 36 and/or any other suitable type of communications antennas may also be located within enclosure 28 and may communicate with circuitry 23 for transmitting data recorded by circuitry 23 to the remote monitoring center 14 via antennas 26 and 36. An internal environmental sensor 38, such as one or more sensor which senses carbon dioxide presence, infra-red emissions, temperature and motion may also communicate with circuitry 23. Outputs of sensor 38, which may indicate the presence of contraband within the container may also be transmitted via antennas 26 and 36 for remote monitoring thereof.

Figure 4:
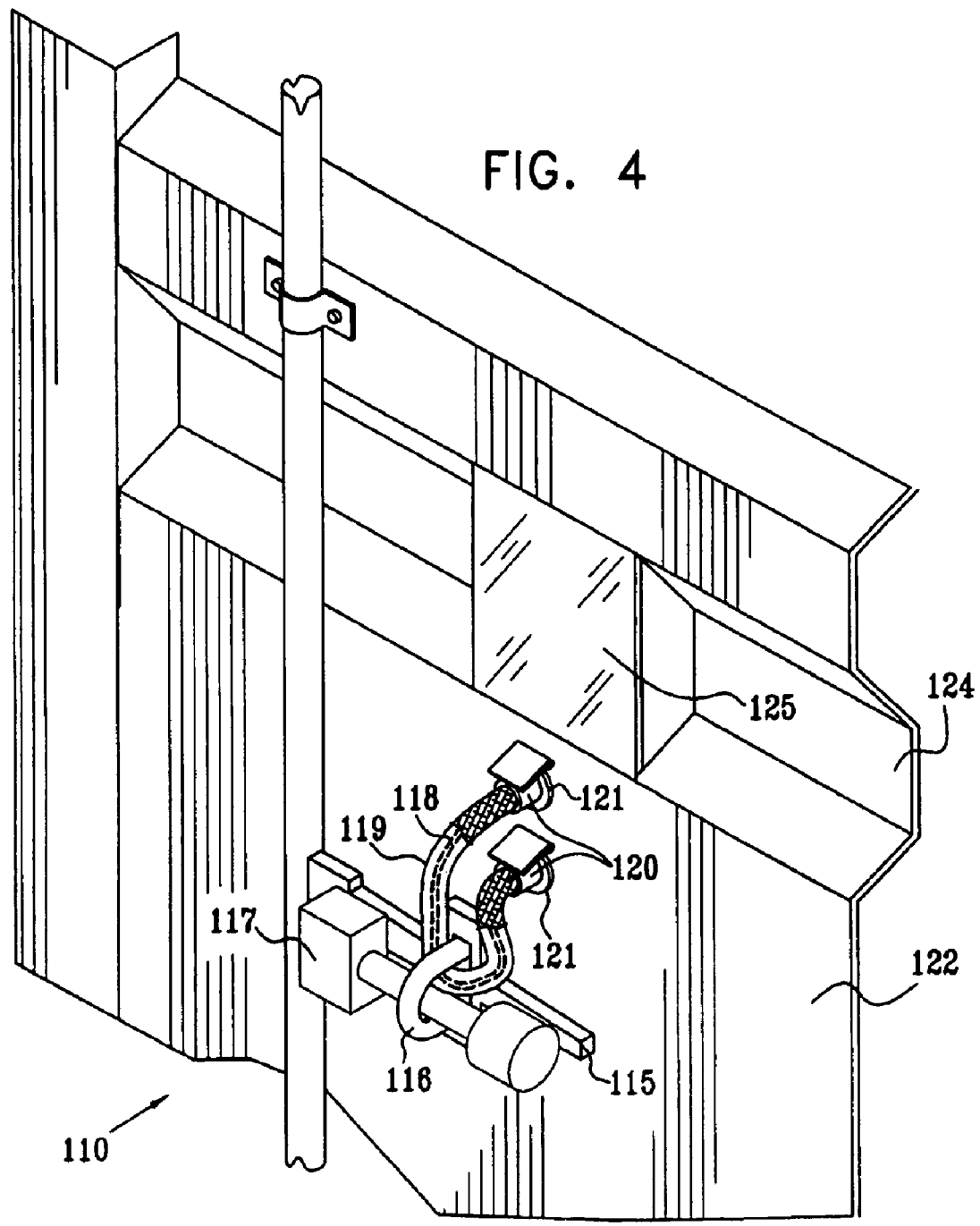
FIG. 4 is a simplified illustration showing an alternative embodiment of sealing engagement of a door lock handle of a shipping container of the type illustrated in FIG. 1.

Reference is now made to FIG. 4, which illustrates an alternative embodiment of locking a shipping container in a shipping container communications system constructed and operative in accordance with a preferred embodiment of the present invention. As seen in FIG. 4, a shipping container 110, which may be a conventional shipping container useful for land and sea transport and which may communicate with multiple communicators, employs one or more hasps 115 which are fixed to door latches and are rotatably engageable with corresponding lockable members, such as loops 116, in the manner shown in FIGS. 1 and 2. Here a tamper resistant remotely monitorable electronic seal 117 is employed instead of the padlock 17 described hereinabove with reference to FIGS. 1 & 2. The tamper resistant remotely monitorable electronic seal 117, preferred embodiments of which are described hereinbelow with reference to FIGS. 6A-13B, engages a portion of loop 116 which extends through a hasp 115, preventing disengagement of the hasp from the loop and thus preventing unlocking of the door. In order to additionally confirm integrity of the lock, an electronic seal wire 118 is preferably passed through the loop 116 over the hasp 115. A preferred electronic seal wire is described and claimed in applicant/assignee's U.S. Pat. No. 6,069,563, the description of which is hereby incorporated by reference. In the illustrated embodiment of FIG. 4, the electronic seal wire 118 is encased in a reinforced steel sleeve 119.

In accordance with a preferred embodiment of the present invention, first and second plugs 120 electrically communicating with respective first and second ends of the electronic seal wire 118 are removably received in respective sockets 121 which are recessed behind a wall 122 of a container door.

In accordance with a preferred embodiment of the present invention, the sockets 121 communicate with electronic circuitry (not shown) such as circuitry 23 (FIG. 3), which in turn communicates with RF antennas which are located within an enclosure 28 (FIG. 3) defined by an outer wall 124 of the container, typically formed of steel, and a cover 125, preferably formed of plastic or other dielectric material, which does not appreciably attenuate the output of the RF transmitting antennas. It is appreciated that the tamper resistant remotely monitorable seal 117 may also communicate directly with presence sensor and communicator 12.

Figure 5:
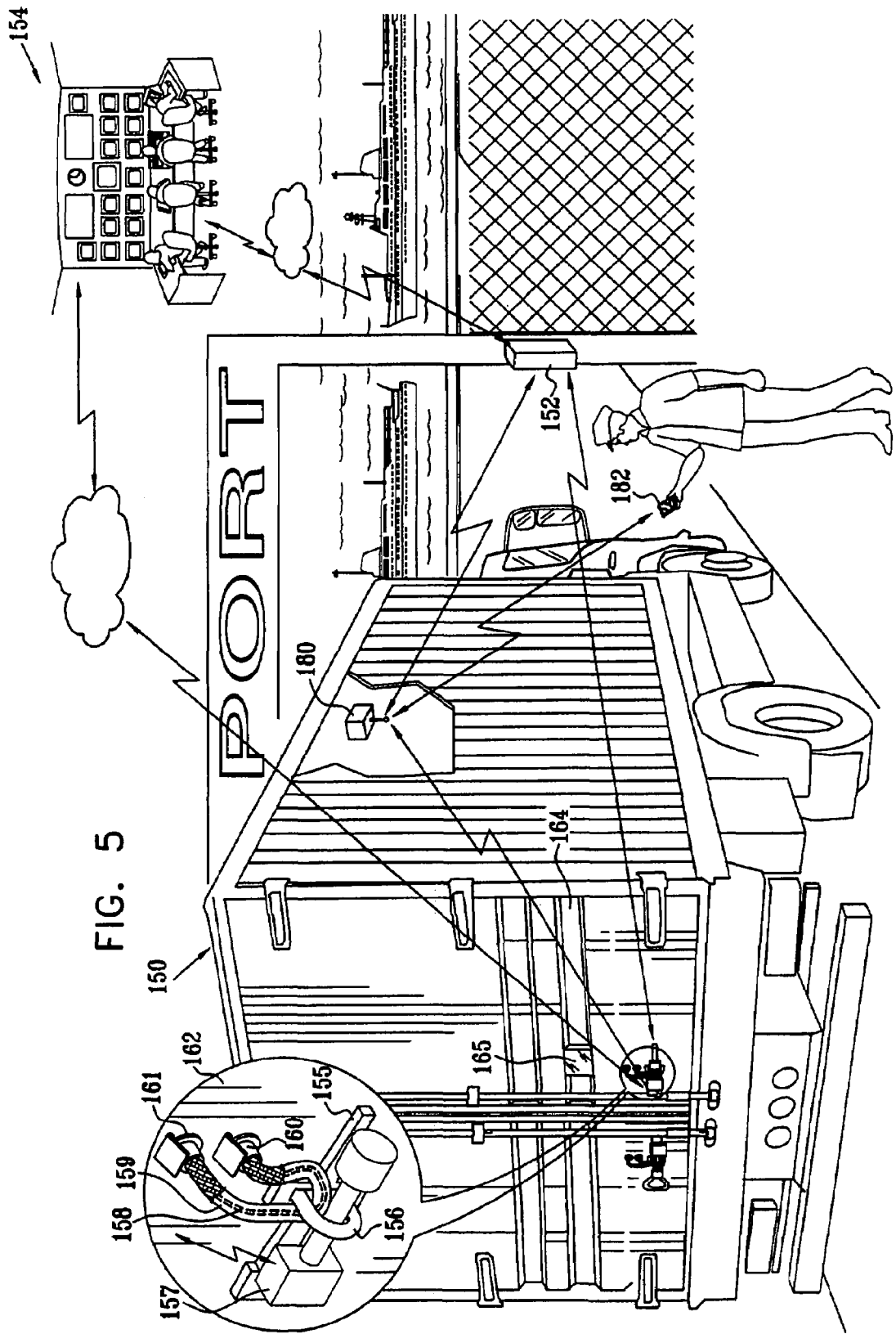
FIG. 5 is a simplified illustration of a shipping container communications system constructed and operative in accordance with another preferred embodiment of the present invention.

Reference is now made to FIG. 5, which illustrates a shipping container communications system constructed and operative in accordance with another preferred embodiment of the present invention. As seen in FIG. 5, a shipping container 150, which may be a conventional shipping container useful for land and sea transport, is shown in communication with multiple communicators, including, for example, a presence communicator 152, located at the gate of a port, and a remote monitoring center 154, which may communicate with presence communicator 152 via a network in a wired or wireless manner. It is appreciated that any suitable type of shipping container may be employed. The term "shipping container" is used herein in a very broad sense to include any enclosure in which goods may be transported or stored.

Conventionally, shipping containers employ one or more hasps 155, which are fixed to door latches and are rotatably engageable with corresponding lockable members, such as loops 156, in the manner shown in FIGS. 5 and 6. Tamper resistant remotely monitorable electronic seal 157 is employed, and engages a portion of loop 156 which extends through hasp 155, preventing disengagement of the hasp 155 from the loop 156 and thus preventing unlocking of the door. In order to additionally confirm integrity of the lock, an electronic seal wire 158 is preferably passed through the loop 156 over the hasp 155. In the illustrated embodiment, the electronic seal wire 158 is encased in a reinforced steel sleeve 159. A preferred electronic seal wire is described and claimed in applicant/assignee's U.S. Pat. No. 6,069,563, the description of which is hereby incorporated by reference.

In accordance with a preferred embodiment of the present invention, first and second plugs 160, electrically communicating with respective first and second ends of the electronic seal wire 158, are removably received in respective sockets 161, which are recessed behind a wall 162 of a container door.

Electronic circuitry (not shown) such as circuitry 23 (FIG. 3), which in turn communicates with RF antennas which are located within an enclosure 28 (FIG. 3) defined by an outer wall 164 of the container, typically formed of steel, and a cover 165, preferably formed of plastic or other dielectric material, which does not appreciably attenuate the output of the RF transmitting antennas.

Additionally in accordance with a preferred embodiment of the present invention, GPS and GSM antennas (not shown) and/or any other suitable type of communications antennas may also be located within the enclosure and may communicate with the electronic circuitry for transmitting data recorded by the electronic circuitry to the remote monitoring center 154 via the RF antennas.

In accordance with a preferred embodiment of the present invention, at least one sensor unit 180 is mounted within the shipping container 150. Sensor unit 180 preferably communicates directly with electronic seal 157. The electronic seal 157 communicates with remote monitoring center 154. The electronic seal 157 may communicate with remote monitoring center via presence communicator 152, via the RF antennas located behind cover 165 or in any other suitable manner. Additionally or alternatively, sensor unit 180, located within the shipping container 150, may communicate with a remote communication unit 182 at short range and may also communicate with presence communicator 152.

It is appreciated that sensor unit 180 may be an internal sensor, which may include one or more sensors which sense carbon dioxide presence, infra-red emissions, temperature, motion, seismic waves, acoustic waves and radiation. Sensor unit 180 may additionally or alternatively include any other suitable type of sensor and may also communicate with the electronic circuitry of the shipping container 150.

Figure 6A:
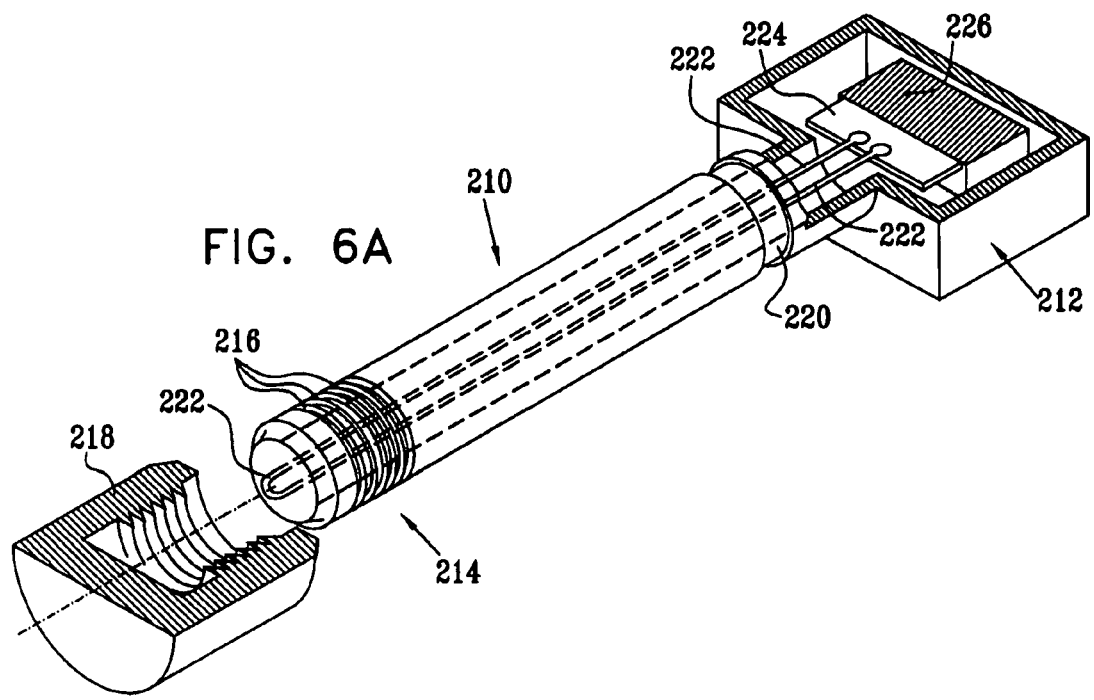
FIGS. 6A and 6B are simplified pictorial illustrations of two stages in the assembly of a press-fit electronic seal particularly useful as a tamper resistant remotely monitorable electronic seal of the type illustrated in FIG. 4.
Figure 6B:
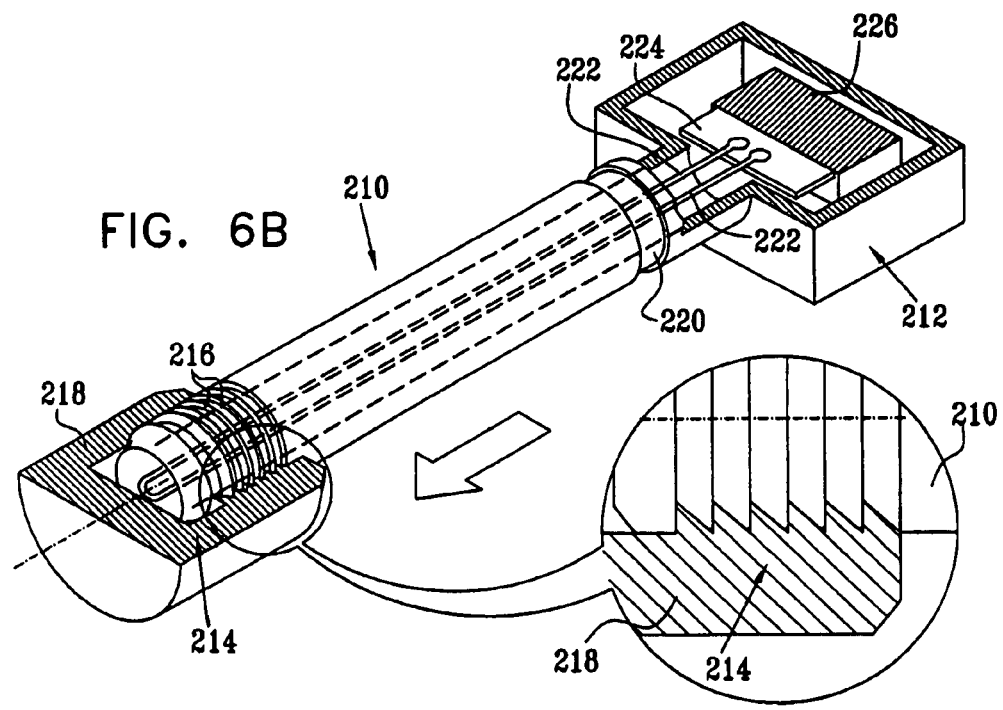

Reference is now made to FIGS. 6A and 6B, which are simplified pictorial illustrations of two stages in the assembly of a press-fit electronic seal particularly useful as tamper resistant remotely monitorable electronic seals 117 and 157 in the embodiments of FIGS. 4 and 5.

As seen in FIGS. 6A and 6B, there is provided a tamper-resistant electronic seal which preferably comprises a shaft portion 210, which is integrally formed with or fixed to a sensing circuitry and transceiver portion 212. Shaft portion 210 preferably has a generally cylindrical configuration and terminates in a press-fit tip 214, preferably formed with a series of circumferential teeth 216 which are adapted for press-fit engagement with corresponding tooth-like recesses formed in a socket 218. The press-fit engagement between tip 214 of shaft portion 210 and socket 218 is preferably such that it is impossible to remove the tip 214 from the socket 218 without breaking the shaft portion 210.

Shaft portion 210 preferably includes a weakened frangible portion 220, located intermediate the sensing circuitry and transceiver portion 212 and the tip 214. Frangible portion 220 is preferably located closer to sensing circuitry and transceiver portion 212 than to tip 214 and typically has a lesser thickness than the remainder of the shaft portion 210.

A conductive loop 222 preferably extends through shaft portion 210 through to the tip 214 thereof and is configured and mounted in shaft portion 210, such that breakage of the shaft portion 210 produces a disconnection or significant change in the electrical properties of the conductive loop 222.

In accordance with a preferred embodiment of the present invention, sensing circuitry 224 and an RF transceiver 226 are housed within sensing circuitry and transceiver portion 212. Sensing circuitry 224 is electrically coupled to conductive loop 222 and senses the integrity thereof. Receiving an output from sensing circuitry 224 is transceiver 226, which is operative to provide transmitted information indicating whether the conductive loop 222 is intact. Conventional wireless monitoring circuitry (not shown) may be employed to receive information which is transmitted by RF transceiver 226 and indicates tampering with the seal which results in breakage of the shaft portion 210.

Figure 7A:
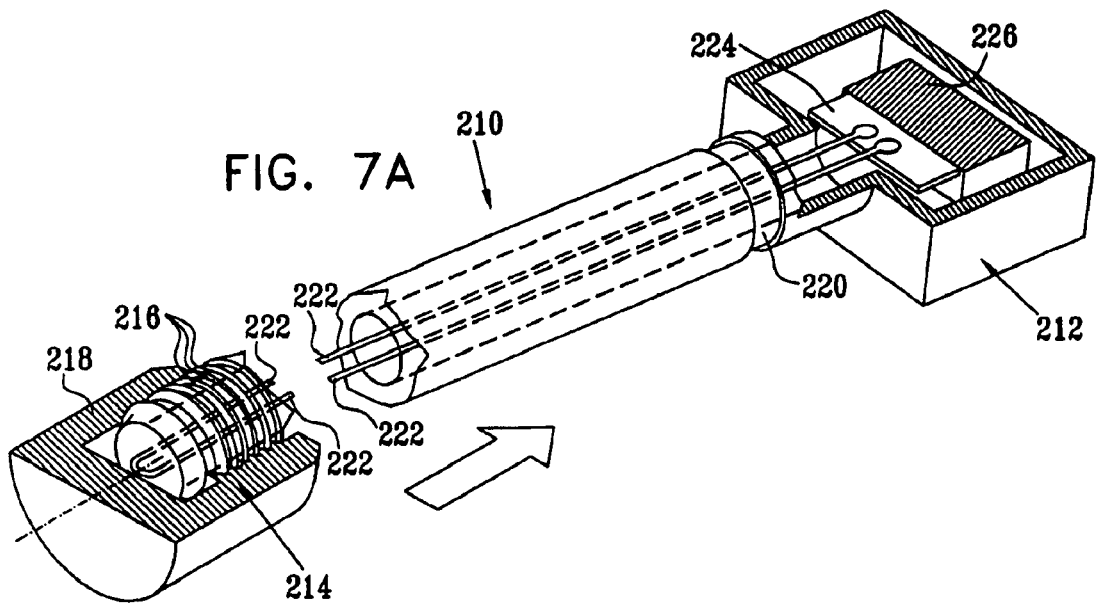
FIGS. 7A and 7B are simplified pictorial illustrations of two different types of breaks produced in the press-fit electronic seal of FIGS. 5A and 5B.
Figure 7B:
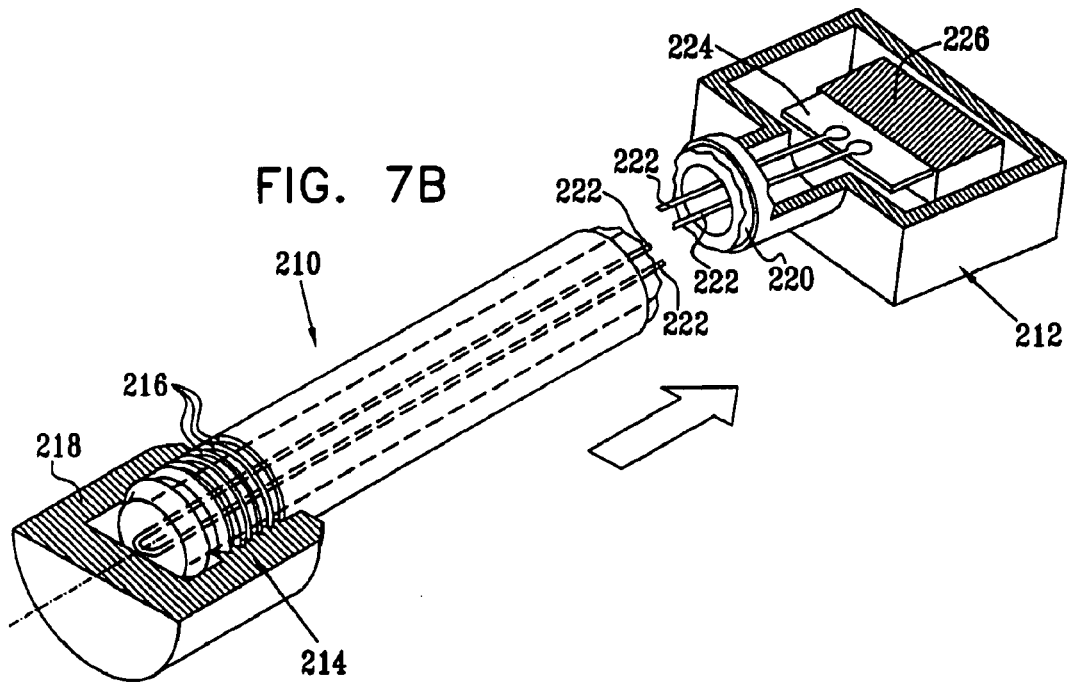

Reference is now made to FIGS. 7A and 7B, which are simplified pictorial illustrations of two different types of breaks produced in the press-fit electronic seal of FIGS. 6A and 6B. As noted above, application of force to the seal of FIGS. 7A and 7B in an attempt to separate shaft portion 210 from socket 218 will not cause tip 214 to be disengaged from socket 218, without first breaking the shaft portion 210. FIG. 7A shows such a break at a location along the shaft portion 210 which lies just above the tip 214. It is seen that this break produces a disconnection or significant change in the electrical properties of the conductive loop 222.

FIG. 7B shows such a break at the frangible portion 220 along the shaft portion 210. It is seen that this break also produces a disconnection or significant change in the electrical properties of the conductive loop 222.

Figure 8A:
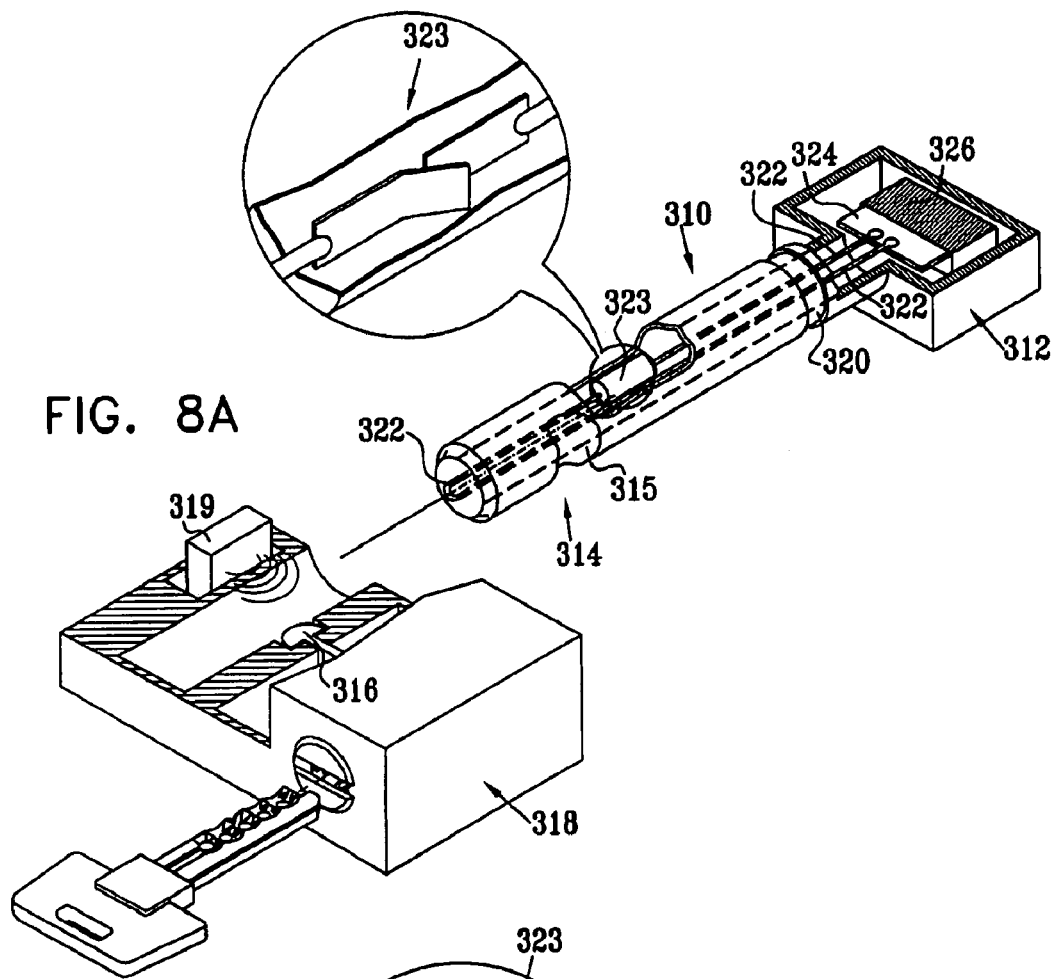
FIGS. 8A and 8B are simplified pictorial illustrations of two stages in the assembly of a lockable electronic seal particularly useful as a tamper resistant remotely monitorable electronic seal of the type illustrated in FIG. 4.
Figure 8B:
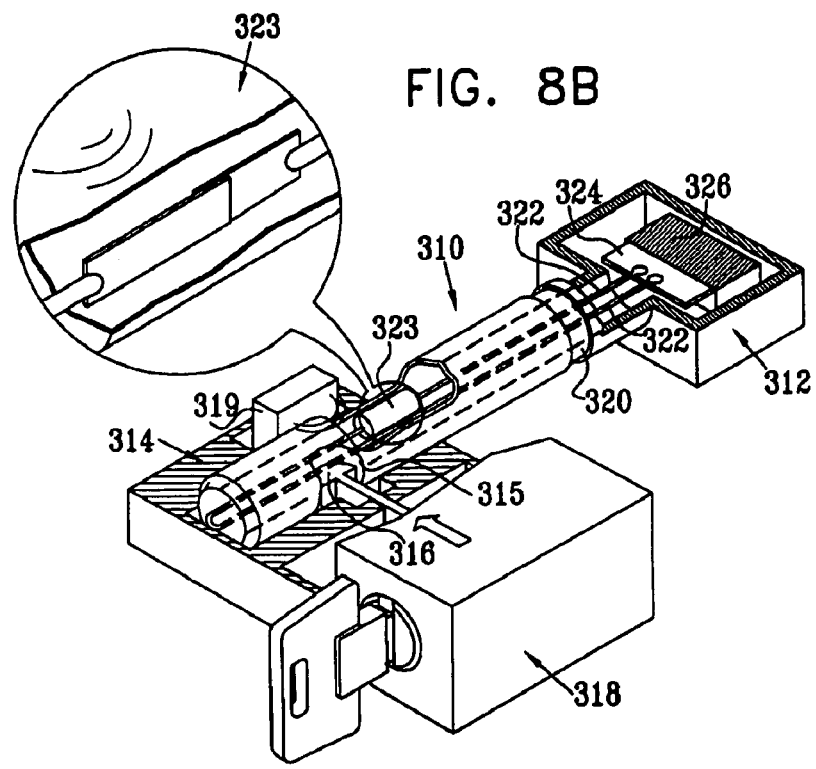

Reference is now made to FIGS. 8A and 8B, which are simplified pictorial illustrations of two stages in the assembly of a lockable electronic seal particularly useful as tamper resistant remotely monitorable electronic seals 117 and 157 in the embodiments of FIGS. 4 and 5.

As seen in FIGS. 8A and 8B, there is provided a tamper-resistant reusable lockable electronic seal which preferably comprises a shaft portion 310, which is integrally formed with or fixed to a sensing circuitry and transceiver portion 312. Shaft portion 310 preferably has a generally cylindrical configuration and terminates in a lockable tip 314, preferably formed with an undercut groove 315 which is adapted for lockable engagement with a corresponding locking element 316 forming part of a lock 318, defining a socket, which includes a magnet 319. Lock 318 is here shown to be a key-operated lock, it being appreciated that any other suitable type of lock may be employed. The locking engagement between tip 314 of shaft portion 310 and locking element 316 is preferably such that without first unlocking the lock, it is impossible to remove the tip 314 from engagement with the locking element 316 without breaking the shaft portion 310.

Shaft portion 310 preferably includes a weakened frangible portion 320, located intermediate the sensing circuitry and transceiver portion 312 and the tip 314. Frangible portion 320 is preferably located closer to sensing circuitry and transceiver portion 312 than to tip 314 and typically has a lesser thickness than the remainder of the shaft portion 310.

A conductive loop 322, including a series connected reed switch 323 which is closed by magnet 319 when shaft portion 310 is in lockable engagement with lock 318, preferably extends through shaft portion 310 through to the tip 314 thereof and is configured and mounted in shaft portion 310, such that breakage of the shaft portion 310 produces a disconnection or significant change in the electrical properties of the conductive loop 322.

In accordance with a preferred embodiment of the present invention, sensing circuitry 324 and an RF transceiver 326 are housed within sensing circuitry and transceiver portion 312. Sensing circuitry 324 is electrically coupled to conductive loop 322 and senses the integrity thereof. Receiving an output from sensing circuitry 324 is transceiver 326, which is operative to provide transmitted information indicating whether the conductive loop 322 is intact. Conventional wireless monitoring circuitry (not shown) may be employed to receive information which is transmitted by RF transceiver 326 and indicates when the shaft portion 310 is located in lockable engagement with lock 318 and when the shaft portion 310 is separated from lock 318 due to either tampering with the seal, which results in breakage of the shaft portion 310, or disengagement of shaft portion 310 and lock 318 by using a key to unlock lock 318. It is appreciated that the provision of reed switch 323 and magnet 319 enables sensing circuitry 324 to sense when the shaft portion 310 is located in lockable engagement with lock 318 and also enables sensing circuitry 324 to sense when the shaft portion 310 is separated from lock 318 for any reason, and allows for recording of engagements and disengagements of shaft portion 310 and lock 318.

Figure 9A:
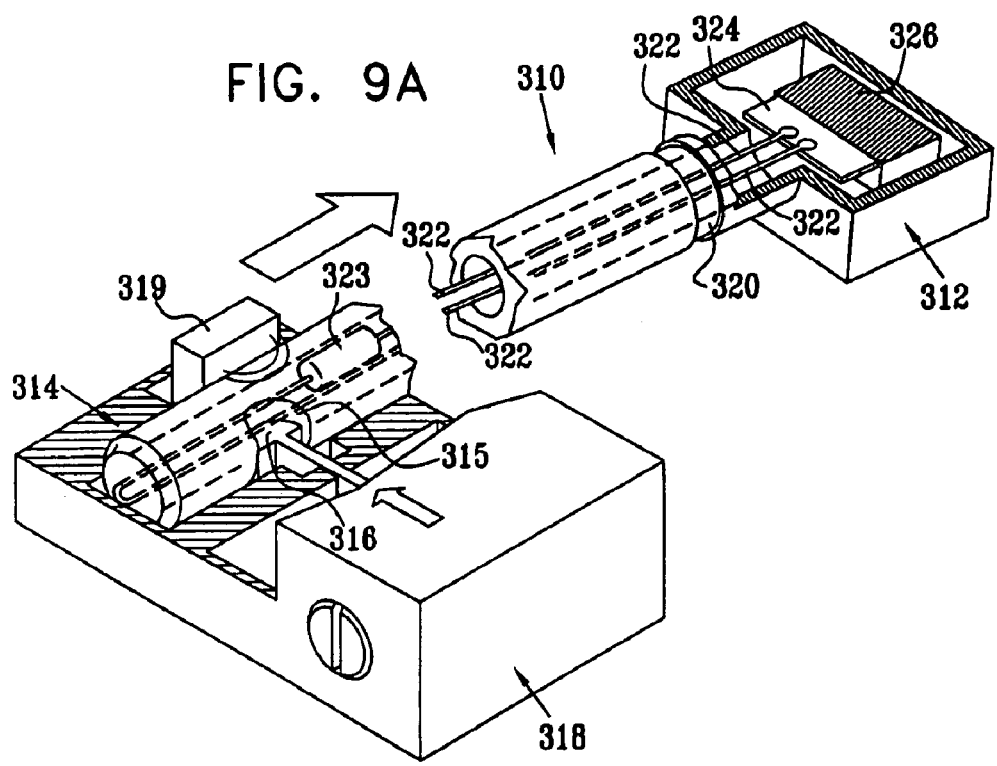
FIGS. 9A and 9B are simplified pictorial illustrations of two different types of breaks produced in the lockable electronic seal of FIGS. 7A and 7B.
Figure 9B:
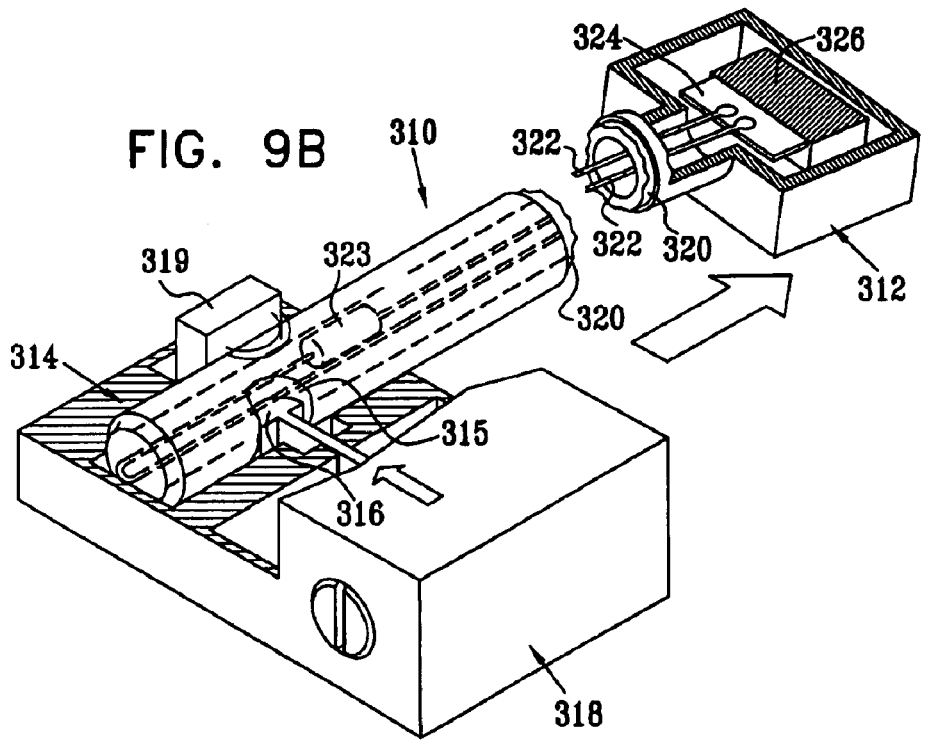

Reference is now made to FIGS. 9A and 9B, which are simplified pictorial illustrations of two different types of breaks produced in the lockable electronic seal of FIGS. 8A and 8B. As noted above, application of force to the seal of FIGS. 9A and 9B in an attempt to separate shaft portion 310 from locking element 316 will not cause tip 314 to be disengaged from locking element 316, without first breaking the shaft portion 310. FIG. 9A shows such a break at a location along the shaft portion 310 which lies just above the tip 314. It is seen that this break produces a disconnection or significant change in the electrical properties of the conductive loop 322.

FIG. 9B shows such a break at the frangible portion 320 along the shaft portion 310. It is seen that this break also produces a disconnection or significant change in the electrical properties of the conductive loop 322.

It is appreciated that the reed switch and magnet shown in the illustrated embodiments of FIGS. 8A-9B can also be used in the embodiments of FIGS. 6A-7B.

Reference is now made to FIGS. 10A and 10B, which are simplified pictorial illustrations of two stages in the assembly of a press-fit electronic seal particularly useful as tamper resistant remotely monitorable electronic seals 117 and 157 in the embodiments of FIGS. 4 and 5.

As seen in FIGS. 10A and 10B, there is provided a tamper-resistant electronic seal which preferably comprises a shaft portion 410, which is integrally formed with or fixed to a sensing circuitry and transceiver portion 412. Shaft portion 410 preferably has a generally cylindrical configuration and terminates in a press-fit tip 414, preferably formed with a series of circumferential teeth 416 which are adapted for press-fit engagement with corresponding tooth-like recesses formed in a socket 418. The press-fit engagement between tip 414 of shaft portion 410 and socket 418 is preferably such that it is impossible to remove the tip 414 from the socket 418 without breaking the shaft portion 410.

Shaft portion 410 preferably includes a weakened frangible portion 420, located intermediate the sensing circuitry and transceiver portion 412 and the tip 414. Frangible portion 420 is preferably located closer to sensing circuitry and transceiver portion 412 than to tip 414 and typically has a lesser thickness than the remainder of the shaft portion 410.

A pair of elongate conductors 422 and 424 preferably extends through shaft portion 410 through to the tip 414 thereof and is configured and mounted in shaft portion 410, such that breakage of the shaft portion 410 produces a disconnection or significant change in the electrical properties of at least one and preferably both of conductors 422 and 424. Preferably, conductors 422 and 424 communicate with respective contacts 426 and 428 which are exposed at the end of tip 414 and are arranged to electrically engage an electrical shorting contact 430 at the corresponding interior surface of socket 418 when shaft portion 410 is fully press-fit mounted into socket 418, thereby defining a conductive loop.

In accordance with a preferred embodiment of the present invention, sensing circuitry 432 and an RF transceiver 434 are housed within sensing circuitry and transceiver portion 412. Sensing circuitry 432 is electrically coupled to conductors 422 and 424 and senses the integrity of a conductive loop which is defined by conductors 422 and 424 when the shaft portion 410 is fully seated in socket 418. Receiving an output from sensing circuitry 432 is transceiver 434, which is operative to provide transmitted information indicating whether the conductive loop is intact. Conventional wireless monitoring circuitry (not shown) may be employed to receive information which is transmitted by RF transceiver 434 and indicates tampering with the seal which results in breakage of the shaft portion 410.

Figure 11A:
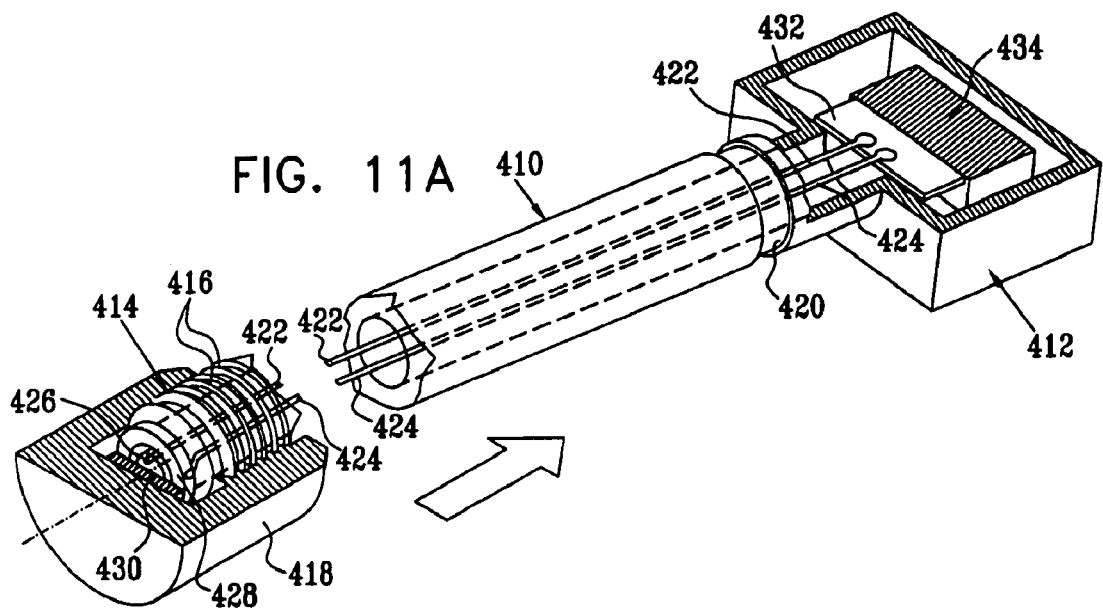
FIGS. 11A and 11B are simplified pictorial illustrations of two different types of breaks produced in the press-fit electronic seal of FIGS. 9A and 9B.
Figure 11B:
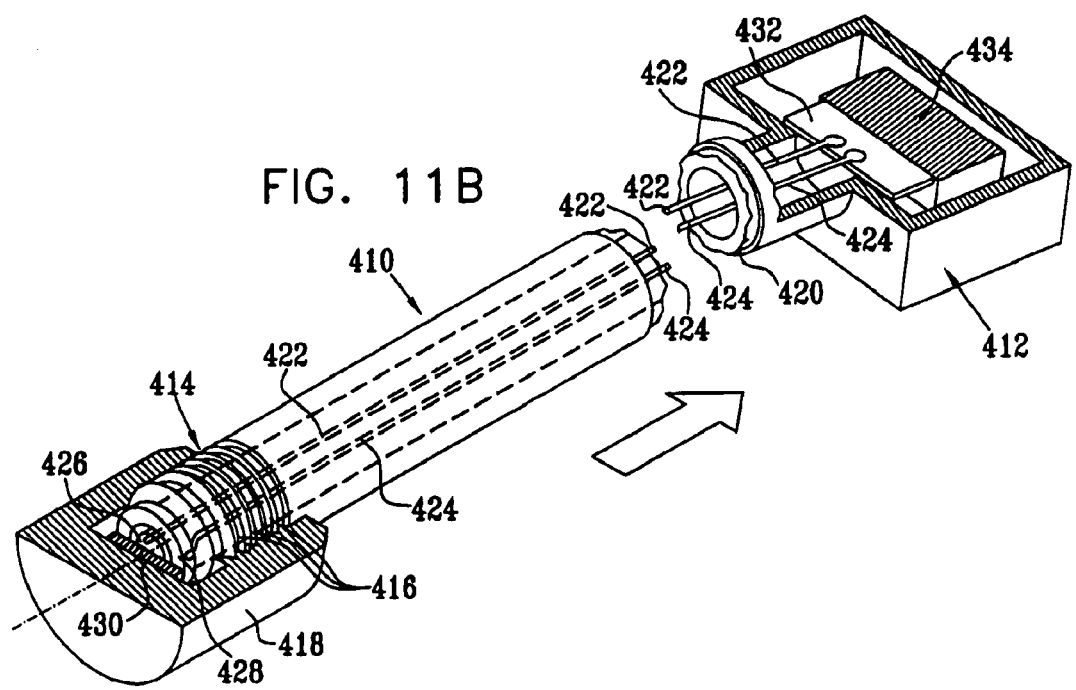

Reference is now made to FIGS. 11A and 11B, which are simplified pictorial illustrations of two different types of breaks produced in the press-fit electronic seal of FIGS. 10A and 10B. As noted above, application of force to the seal of FIGS. 11A and 11B in an attempt to separate shaft portion 410 from socket 418 will not cause tip 414 to be disengaged from socket 418, without first breaking the shaft portion 410. FIG. 11A shows such a break at a location along the shaft portion 410 which lies just above the tip 414. It is seen that this break produces a disconnection or significant change in the electrical properties of the conductive loop defined by conductors 422 and 424.

FIG. 11B shows such a break at the frangible portion 420 along the shaft portion 410. It is seen that this break also produces a disconnection or significant change in the electrical properties of the conductive loop.

Figure 12A:
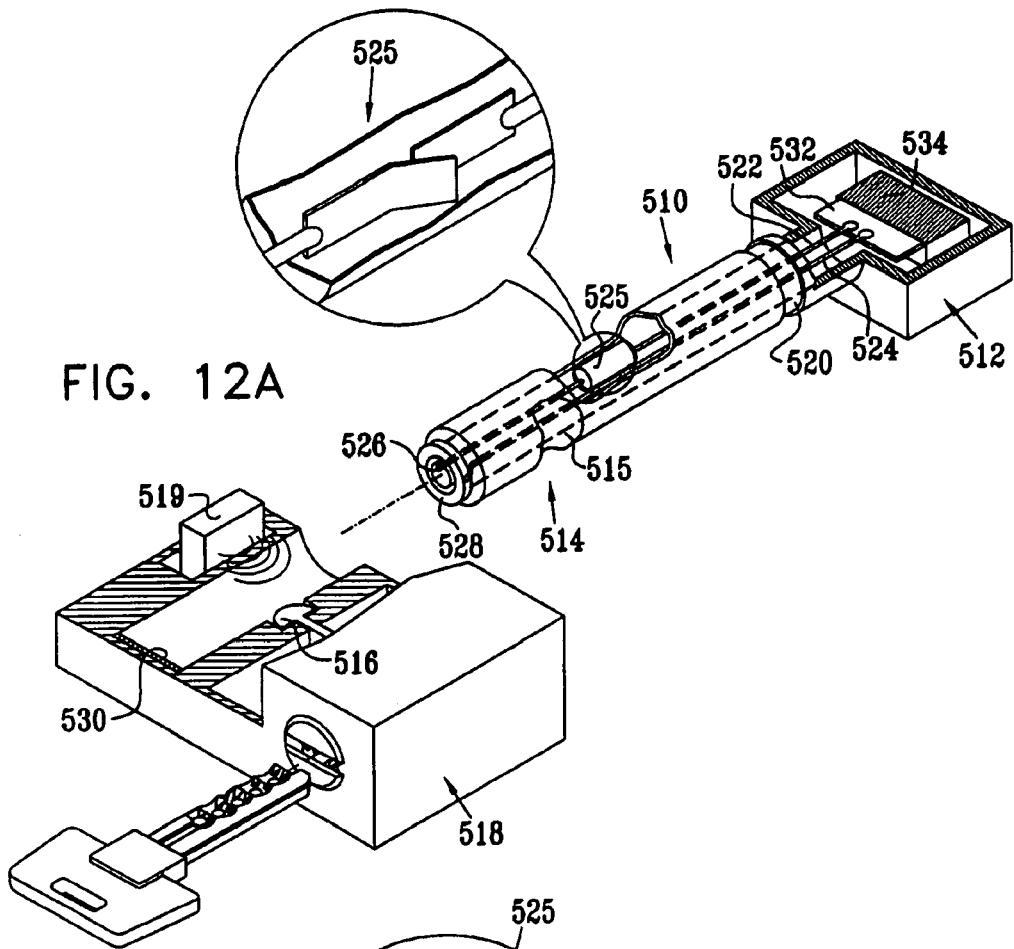
FIGS. 12A and 12B are simplified pictorial illustrations of two stages in the assembly of a lockable electronic seal particularly useful as a tamper resistant remotely monitorable electronic seal of the type illustrated in FIG. 4.
Figure 12B:
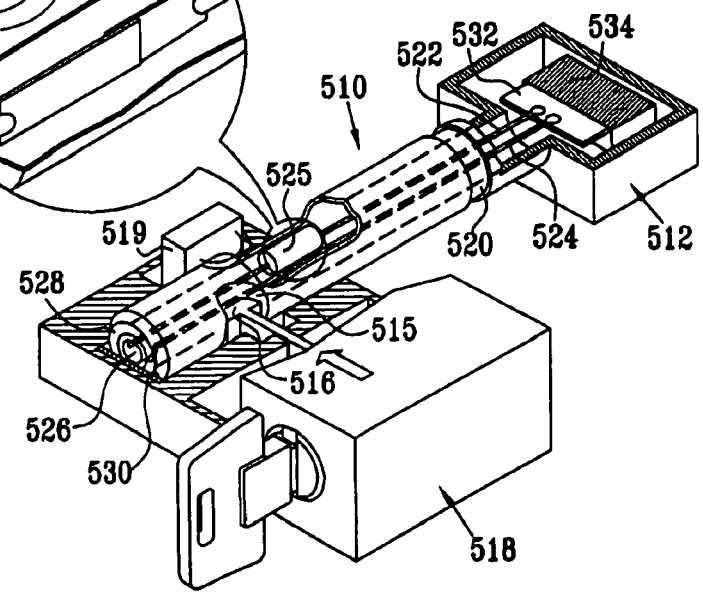

Reference is now made to FIGS. 12A and 12B, which are simplified pictorial illustrations of two stages in the assembly of a lockable electronic seal particularly useful as tamper resistant remotely monitorable electronic seals 117 and 157 in the embodiments of FIGS. 4 and 5.

As seen in FIGS. 12A and 12B, there is provided a tamper-resistant lockable electronic seal which preferably comprises a shaft portion 510, which is integrally formed with or fixed to a sensing circuitry and transceiver portion 512. Shaft portion 510 preferably has a generally cylindrical configuration and terminates in a lockable tip 514, preferably formed with an undercut groove 515 which is adapted for lockable engagement with a corresponding locking element 516 forming part of a lock 518, defining a socket, which includes a magnet 519. Lock 518 is here shown to be a key-operated lock, it being appreciated that any other suitable type of lock may be employed. The locking engagement between tip 514 of shaft portion 510 and locking element 516 is preferably such that without first unlocking the lock, it is impossible to remove the tip 514 from engagement with the locking element 516 without breaking the shaft portion 510.

Shaft portion 510 preferably includes a weakened frangible portion 520, located intermediate the sensing circuitry and transceiver portion 512 and the tip 514. Frangible portion 520 is preferably located closer to sensing circuitry and transceiver portion 512 than to tip 514 and typically has a lesser thickness than the remainder of the shaft portion 510.

A pair of elongate conductors 522 and 524, at least one of which includes a series connected reed switch 525 which is closed by magnet 519 when shaft portion 510 is in lockable engagement with lock 518, extends through shaft portion 510 through to the tip 514 thereof and is configured and mounted in shaft portion 510, such that breakage of the shaft portion 510 produces a disconnection or significant change in the electrical properties of at least one and preferably both of conductors 522 and 524. Preferably, conductors 522 and 524 communicate with respective contacts 526 and 528 which are exposed at the end of tip 514. Contacts 526 and 528 are arranged to electrically engage an electrical shorting contact 530 at the corresponding interior surface of lock 518 when shaft portion 510 is in lockable engagement with lock 518. This electrical engagement, together with the closing of series connected reed switch 525 by magnet 519, thereby defines a conductive loop.

In accordance with a preferred embodiment of the present invention, sensing circuitry 532 and an RF transceiver 534 are housed within sensing circuitry and transceiver portion 512. Sensing circuitry 532 is electrically coupled to conductors 522 and 524 and senses the integrity of a conductive loop which is defined by conductors 522 and 524 when the shaft portion 510 is in lockable engagement with lock 518. Receiving an output from sensing circuitry 532 is transceiver 534, which is operative to provide transmitted information indicating whether the conductive loop is intact. Conventional wireless monitoring circuitry (not shown) may be employed to receive information which is transmitted by RF transceiver 534 and indicates when the shaft portion 510 is located in lockable engagement with lock 518 and when the shaft portion 510 is separated from lock 518 due to either tampering with the seal, which results in breakage of the shaft portion 510, or disengagement of shaft portion 510 and lock 518 by using a key to unlock lock 518. It is appreciated that the provision of reed switch 525 and magnet 519 enables sensing circuitry 532 to sense when the shaft portion 510 is located in lockable engagement with lock 518 and also enables sensing circuitry 532 to sense when the shaft portion 510 is separated from lock 518 for any reason, and allows for recording of engagements and disengagements of shaft portion 510 and lock 518.

Figure 13A:
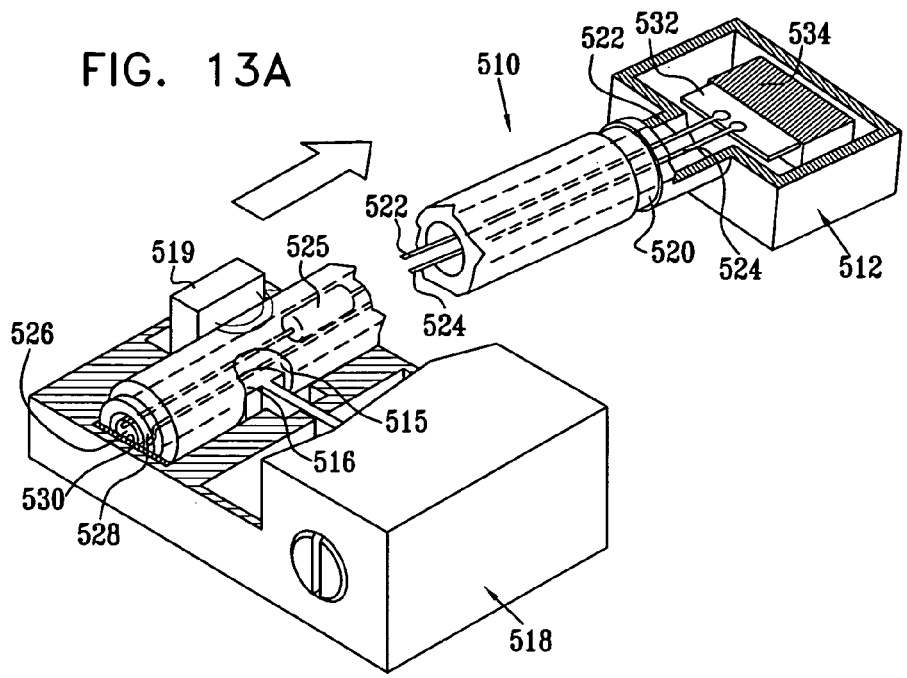
FIGS. 13A and 13B are simplified pictorial illustrations of two different types of breaks produced in the lockable electronic seal of FIGS. 11A and 11B.
Figure 13B:
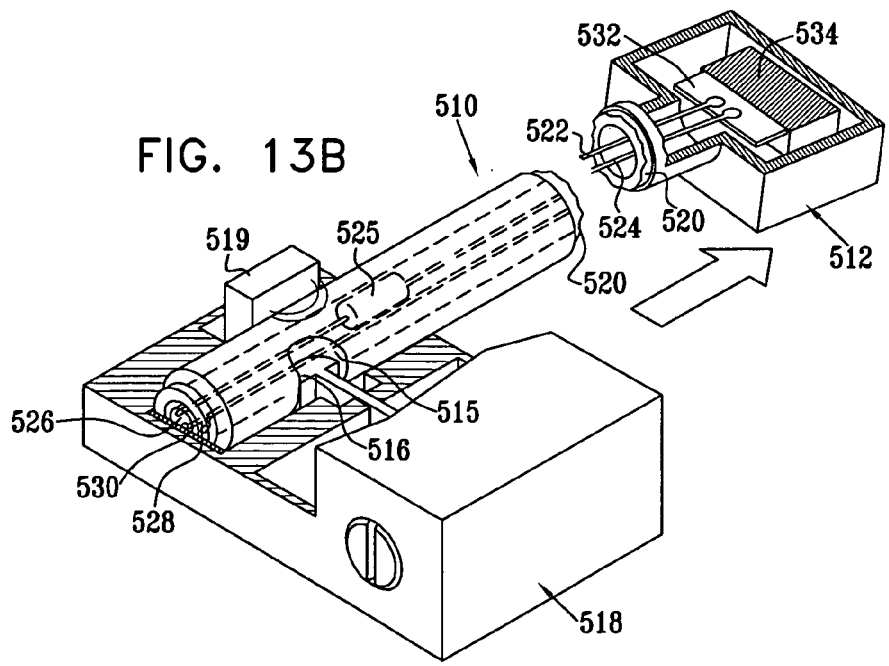

Reference is now made to FIGS. 13A and 13B, which are simplified pictorial illustrations of two different types of breaks produced in the lockable electronic seal of FIGS. 12A and 12B. As noted above, application of force to the seal of FIGS. 13A and 13B in an attempt to separate shaft portion 510 from locking element 516 will not cause tip 514 to be disengaged from locking element 516, without first breaking the shaft portion 510. FIG. 13A shows such a break at a location along the shaft portion 510 which lies just above the tip 514. It is seen that this break produces a disconnection or significant change in the electrical properties of the conductive loop defined by conductors 522 and 524.

FIG. 13B shows such a break at the frangible portion 520 along the shaft portion 510. It is seen that this break also produces a disconnection or significant change in the electrical properties of the conductive loop defined by conductors 522 and 524.

It is appreciated that the reed switch and magnet shown in the illustrated embodiments of FIGS. 12A-13B can also be used in the embodiments of FIGS. 10A-11B.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A monitored shipping container system comprising:
   at least one remotely monitorable shipping container including:
   a shipping container; and
   at least one sensor mounted within the shipping container operative to sense at least one condition within the shipping container and operative to wirelessly transmit sensed information to an electronic seal mounted onto the outside of said shipping container, said electronic seal monitoring a status of said shipping container and being operative to wirelessly transmit information to a remote monitor regarding the status of said electronic seal, and said sensed information; and
   at least one remote communicator communicating with the at least one electronic seal.

2. A monitored shipping container system according to claim 1, and wherein said at least one sensor is operative to communicate directly with at least one short range remote communicator located outside said shipping container.

3. A monitored shipping container system according to claim 2, and wherein said at least one sensor is operative to wirelessly communicate with said at least one short range remote communicator.

4. A monitored shipping container system according to claim 2 and wherein said at least one short range remote communicator is operative to wirelessly transmit information regarding an output of said at least one sensor to said remote communicator.

5. A monitored shipping container system according to claim 4, and wherein the at least one sensor senses at least one of carbon dioxide, infra-red emissions, motion, temperature, seismic waves, acoustic waves and radiation.

6. A monitored shipping container system according to claim 4 and wherein said at least one short range remote communicator also transmits information regarding the status of cargo within said shipping container body.

7. A monitored shipping container system according to claim 2, and wherein the at least one sensor senses at least one of carbon dioxide, infra-red emissions, motion, temperature, seismic waves, acoustic waves and radiation.

8. A shipping container communications system according to claim 1 and wherein said at least one remote communicator comprises at least one of:
   a presence communicator;
   a remote monitoring station; and
   an electronic seal.

9. A shipping container communications system according to claim 1 and wherein said electronic seal comprises at least one transceiver, communicating with the at least one remote communicator and wherein: the at least one remote communicator comprises at least one of:
   a presence communicator;
   a remote monitoring station; and
   an electronic seal.

10. A monitored shipping container system according to claim 1, and wherein the at least one sensor senses at least one of carbon dioxide, infra-red emissions, motion, temperature, seismic waves, acoustic waves and radiation.

* * * * *